(No Model.) 2 Sheets—Sheet 1.
A. B. FERGUSON & J. B. McKELLOR.
COMBINED HARROW AND CULTIVATOR.

No. 438,880. Patented Oct. 21, 1890.

WITNESSES
INVENTOR
Attorney.

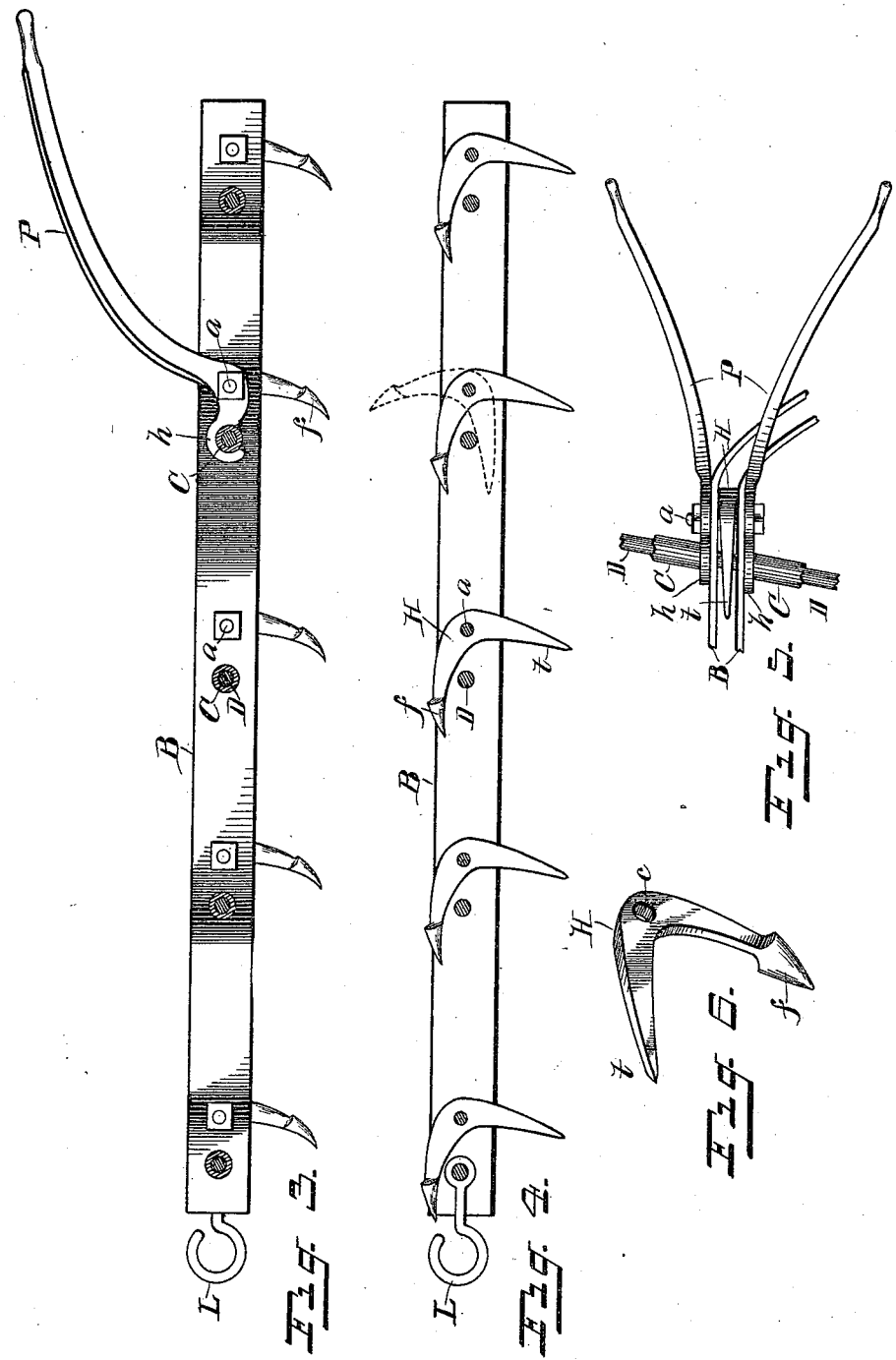

UNITED STATES PATENT OFFICE.

ARCHIBALD B. FERGUSON, OF FREMONT, AND JOHN B. McKELLOR, OF SPEAKER, MICHIGAN.

COMBINED HARROW AND CULTIVATOR.

SPECIFICATION forming part of Letters Patent No. 438,880, dated October 21, 1890.

Application filed March 8, 1890. Serial No. 343,187. (No model.)

*To all whom it may concern:*

Be it known that we, ARCHIBALD B. FERGUSON, a British subject, residing in the township of Fremont, county of Sanilac, Michigan, and JOHN B. McKELLOR, a citizen of the United States, residing in the township of Speaker, in the county of Sanilac and State of Michigan, have invented certain new and useful Improvements in a Combined Harrow and Cultivator; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in combined harrows and cultivators in which the frame-work is composed of independent sections made of metal and zigzag in form, the sections being coupled by an arching yoke or connecting-rod crossing from one section to another and pivotally attached at its ends to said sections. Each section is provided with a series of elbow-shaped teeth pivoted at the point of angle between the parallel bars of the frame.

The object of the invention is to produce a combined harrow and cultivator that is cheap, light, and durable; that may be readily converted from a harrow into a cultivator or from a cultivator into a harrow, as desired, and one that in either capacity employed may be easily handled and is efficient in its work. This object is attained by the implement illustrated in the accompanying drawings, in which—

Figure 1:
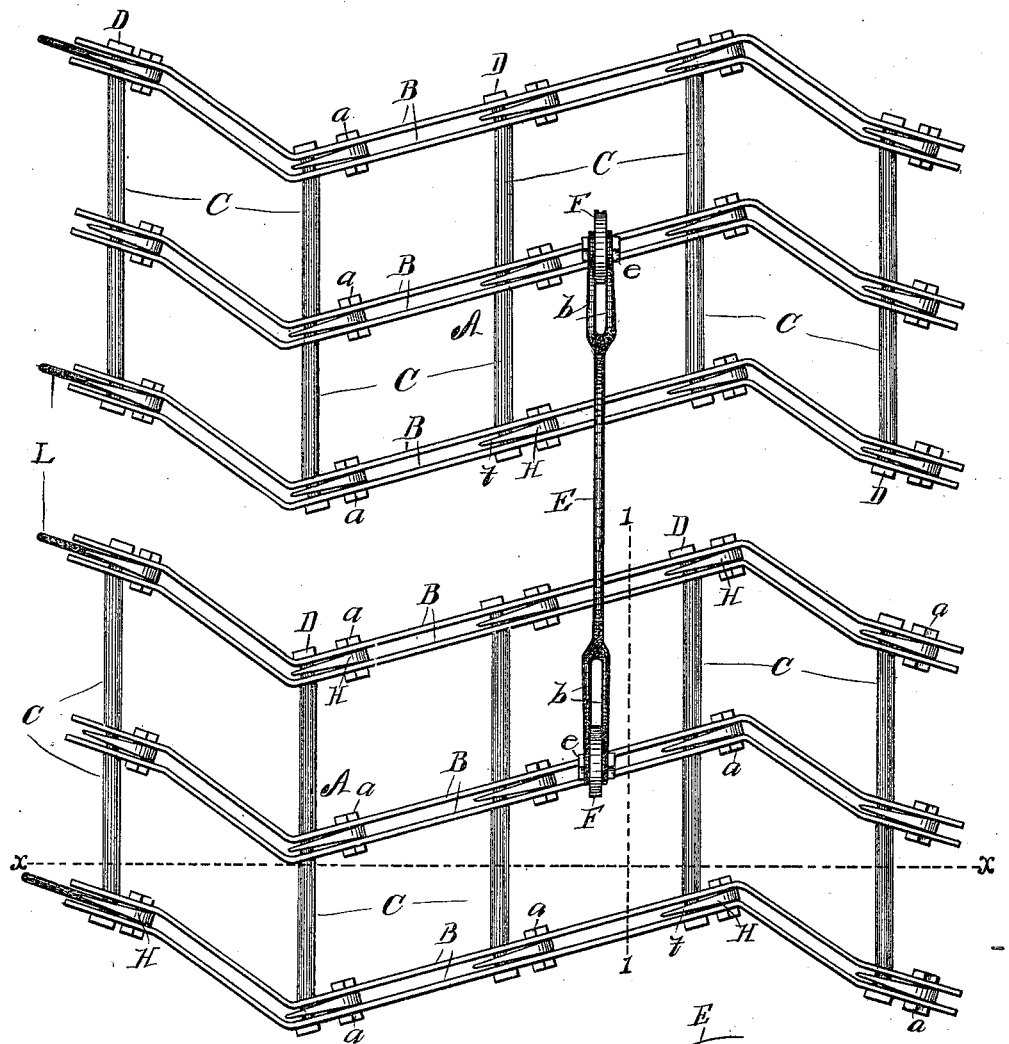
Figure 2:
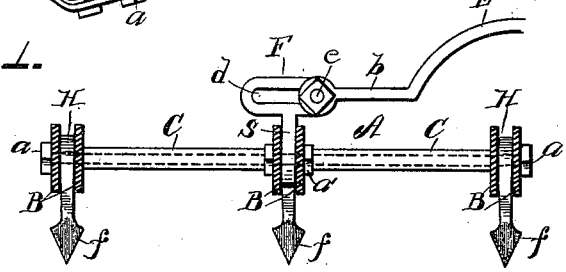

Figure 1 is a plan view of two sections of our improved harrow and cultivator. Fig. 2 is a cross-section on dotted line 1 1 of Fig. 1. Fig. 3 is a longitudinal section on dotted line *x x* of Fig. 1. Fig. 4 is a side elevation of the frame, one of the angle-bars being removed, showing the manner of pivoting the teeth between the bars of the frame. Fig. 5 is a detail showing the manner of securing the handles to one of the sections. Fig. 6 is an enlarged view of one of the teeth.

Referring to the letters of reference, A indicates the frame of the implement. There may be two or more of these sections of frame employed to form a harrow, as desired, each section being formed independent and composed of a series of double parallel bars B. Said bars are of iron and zigzag in form, and are adapted to receive the teeth H between their adjacent faces. The series of double bars B are coupled by the rods D passing therethrough and are held the desired distance apart by the sleeves C encircling said rods, as shown in Fig. 1. The sections A are coupled by means of the arched yoke or connecting-rod E, the forked ends *b* of which being pivotally attached by the bolt *e* to the T-shaped heads F of the sections, as clearly shown in Fig. 1. This manner of coupling the sections allows each section to rock independent of the other sections, so as to conform to the uneven surface of the ground. The T-shaped head F of the section is provided with the elongated slot *d*, as shown in Fig. 2, to afford means for attaching the ends of the connecting-yokes thereto. Said head is secured to the section by the bolt *a'*, passing through the bars B and through the shank *s* of said head, as shown in same figure.

The teeth H are elbow-shaped and are provided at one end with the harrow-point *t* and at the other end with the shovel-point *f*, and have the hole *c* passing therethrough at the point of angle, as clearly shown in Fig. 6. Said teeth are pivotally mounted between the bars B by means of the bolts *a*, passing through said bars and through the hole *c* in said teeth, as clearly shown in Fig. 4. By tightening the nut of the bolts *a* the bars B may be drawn against the sides of the teeth, thus firmly locking the teeth when set, the shape of the teeth being such that the point of the teeth not in use will lie between the adjacent faces of the bars B of the frame, as shown in Figs. 1 and 4.

Figs. 1, 2, and 3 show the implement as set for cultivating, with the shovel-point of the teeth down. To change it to a harrow, the T-shaped heads F, to which the yoke E is attached, are uncoupled from the sections A, said sections turned over, and said heads recoupled thereto. The harrow-point *t* of the teeth is then turned down to the position shown in Fig. 4 and secured, when the implement may be used as a harrow. The angle of the frame is such that the teeth do not stand in line with one another. Therefore, as the implement is drawn ahead every portion of the ground covered thereby is thoroughly worked. The sections A are of such width as to pass between rows of corn as in cultivating, the arched yoke coupling the sections permitting the employment of the implement in this capacity until the corn has attained considerable height. To cultivate high corn, the sections are uncoupled and only a single section employed.

When desired, the implement may be provided with the handles P, which are secured to the end of the section by means of the bolt $a$. The hooked arms $h$ of the handles engage over the sleeve C, whereby said handles are secured in place, as shown in Figs. 3 and 5.

The clevis eyes or hooks L, secured to the end of the sections, afford means of attachment thereto whereby the implement is drawn.

Having thus fully set forth our invention, what we claim as new, and desire to secure by Letters Patent, is—

1. The implement-frame composed of a series of zigzag bars arranged parallel with each other and in sets of two, combined with the rods passing through the series of bars, the sleeves on said rods, said sleeves located between the sets of bars, and the elbow-shaped teeth pivotally mounted between the sets of zigzag bars, substantially as specified.

2. In combination with the herein-described frame, the T-shaped head having the elongated slot therein, and the forked connecting-rod pivotally connected thereto, as and for the purposes specified.

3. In combination with the implement-frame, the handles having the hooked arms $h$ engaging over the sleeve of the frame, and the bolt $a$, securing the handles to the outer face of the angle-bars, as and for the purposes specified.

In testimony whereof we affix our signatures in presence of two witnesses.

ARCHIBALD B. FERGUSON.
JOHN B. McKELLOR.

Witnesses as to A. B. Ferguson:
H. W. CLARK,
HARRIS WOODS.

Witnesses as to J. B. McKellor:
WALTER WOODS,
GEORGE GARRISON.